(12) United States Patent
Banerjee et al.

(10) Patent No.: US 11,743,037 B2
(45) Date of Patent: Aug. 29, 2023

(54) QUANTUM KEY DISTRIBUTION SYSTEM AND METHOD FOR PERFORMING DIFFERENTIAL PHASE SHIFT IN A QUANTUM NETWORK

(71) Applicant: QuNu Labs Pvt Ltd, Bengaluru (IN)

(72) Inventors: Anindita Banerjee, Bengaluru (IN); Rajesh Kumar Krishnan, Bengaluru (IN)

(73) Assignee: QuNu Labs Private Ltd

( * ) Notice: Subject to any disclaimer, the term of this patent is extended or adjusted under 35 U.S.C. 154(b) by 200 days.

(21) Appl. No.: 17/388,705

(22) Filed: Jul. 29, 2021

(65) Prior Publication Data
US 2023/0035266 A1 Feb. 2, 2023

(51) Int. Cl.
*H04L 9/08* (2006.01)
*G06N 10/00* (2022.01)

(52) U.S. Cl.
CPC .......... *H04L 9/0852* (2013.01); *G06N 10/00* (2019.01); *H04L 9/0819* (2013.01)

(58) Field of Classification Search
USPC ........ 380/255, 264, 276, 279; 726/2, 21, 36; 713/150, 163, 181
See application file for complete search history.

(56) References Cited

U.S. PATENT DOCUMENTS

| | | | | |
|---|---|---|---|---|
| 5,764,765 A * | 6/1998 | Phoenix | ................. | H04L 9/0858 380/256 |
| 6,748,083 B2 * | 6/2004 | Hughes | ................. | H04L 9/0858 380/278 |
| 7,437,081 B2 * | 10/2008 | Mitchell | ................. | H04B 10/70 398/154 |
| 8,675,876 B2 * | 3/2014 | Yamamoto | ............ | H04L 9/0858 380/278 |
| 8,855,316 B2 * | 10/2014 | Wiseman | .............. | H04L 9/0855 380/278 |
| 9,960,465 B2 * | 5/2018 | Dudley | ............... | H01M 50/204 |
| 10,057,058 B2 * | 8/2018 | Murakami | ........... | H04L 9/0858 |

(Continued)

FOREIGN PATENT DOCUMENTS

| | | |
|---|---|---|
| CN | 105515767 A | 4/2016 |
| JP | 6214093 B2 | 10/2017 |

*Primary Examiner* — Sharif E Ullah
(74) *Attorney, Agent, or Firm* — Jason C. Cameron (57) ABSTRACT

A system and method for performing differential phase shift in a quantum network are disclosed. The method includes determining a quantum key distribution (QKD) configuration for a quantum signal comprising a series of pulses based on signal amplitude, signal pulse width and block length. Further, the method includes grouping pulses to generate quantum signal blocks based on determined QKD configuration. The method includes assigning a random label to each of the quantum signal block based on the determined quantum key distribution configuration. Also, the method includes performing hybrid phase modulation to each of the pulses individually and to each of the quantum signal blocks with a defined phase difference between the each of the pulses individually and each of the quantum signal blocks. The hybrid phase modulation is performed based on the assigned random label. Further, the method includes transmitting the hybrid phase modulated quantum signal blocks to receiving units.

18 Claims, 5 Drawing Sheets

(56) References Cited

U.S. PATENT DOCUMENTS

| | | | |
|---|---|---|---|
| 10,541,809 B2* | 1/2020 | Godfrey | H04L 9/0855 |
| 2005/0138352 A1* | 6/2005 | Gauvreau | H04L 9/3247 |
| | | | 713/153 |
| 2007/0065154 A1* | 3/2007 | Luo | H04J 14/0282 |
| | | | 398/141 |
| 2007/0076884 A1* | 4/2007 | Wellbrock | H04L 9/0855 |
| | | | 380/263 |
| 2007/0195774 A1* | 8/2007 | Sherman | H04L 69/16 |
| | | | 370/392 |
| 2011/0206204 A1* | 8/2011 | Sychev | H04J 14/0273 |
| | | | 380/256 |
| 2011/0213979 A1* | 9/2011 | Wiseman | H04L 9/0844 |
| | | | 713/171 |
| 2014/0010234 A1* | 1/2014 | Patel | H04L 45/74 |
| | | | 370/392 |
| 2014/0068765 A1* | 3/2014 | Choi | H04L 63/1416 |
| | | | 726/23 |
| 2014/0133652 A1* | 5/2014 | Oshida | H04L 9/0897 |
| | | | 380/255 |
| 2016/0241396 A1* | 8/2016 | Fu | H04L 9/0836 |
| 2016/0359626 A1* | 12/2016 | Fu | H04L 9/0858 |
| 2016/0366094 A1* | 12/2016 | Mason | H04L 61/5038 |
| 2017/0214525 A1* | 7/2017 | Zhao | H04W 12/0431 |
| 2017/0230173 A1* | 8/2017 | Choi | H04L 9/12 |
| 2018/0176091 A1* | 6/2018 | Yoon | H04L 43/0888 |
| 2019/0036821 A1* | 1/2019 | Levy | G06F 12/0868 |
| 2019/0349392 A1* | 11/2019 | Wetterwald | H04L 43/0852 |
| 2020/0084222 A1* | 3/2020 | William | H04L 9/3242 |
| 2020/0274701 A1* | 8/2020 | Yuan | H04L 9/3066 |

\* cited by examiner

QUANTUM KEY DISTRIBUTION SYSTEM AND METHOD FOR PERFORMING DIFFERENTIAL PHASE SHIFT IN A QUANTUM NETWORK

FIELD OF INVENTION

Embodiments of a present disclosure relate to communication systems and more particularly to quantum key distribution system and method for performing differential phase shift in a quantum network.

BACKGROUND

Quantum key distribution (QKD) is a well-known technique which offers the possibility of secure key distribution. QKD relies on fundamental quantum properties and allows two parties, commonly referred to as Alice and Bob, to exchange a value and know that an eavesdropper, usually referred to as Eve, has not learnt much about the value. QKD allows key material to be securely derived by Alice and Bob as needed, which offers significant advantages over other methods of key distribution. QKD as described however requires an uninterrupted and secure optical path from Alice to Bob to act as a quantum channel. This may be in free space or through an optical waveguide such as a fibre optic cable. In either case distances are limited, not least due to the use of single photons. Further in a network having a large number of connected users, it will be impractical for each user to have a direct optical link with each other user. This requires highest level of security for transmission of quantum signal from source node to target node without eavesdropping.

Hence, there is a need for an improved and more secured quantum key distribution system and method for performing differential phase shift in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a quantum key distribution system for performing differential phase shift in a quantum network is disclosed. The quantum key distribution system includes a hardware processor and a memory coupled to the hardware processor. The memory comprises a set of program instructions in the form of a plurality of subsystems, configured to be executed by the hardware processor. The plurality of subsystems comprises a configuration selection subsystem configured for determining a quantum key distribution (QKD) configuration for a quantum signal comprising a series of pulses based on signal amplitude, signal pulse width and block length. The plurality of subsystems further includes a compartment generation subsystem configured for grouping one or more pulses to generate one or more quantum signal blocks based on determined QKD configuration. The one or more quantum signal blocks comprises grouped sequence of one or more pulses. The plurality of subsystems further comprises a label generation subsystem configured for assigning a random label to each of the one or more quantum signal blocks based on the determined quantum key distribution configuration. Also, the plurality of subsystems comprises a hybrid phase modulation subsystem configured for performing hybrid phase modulation to each of the one or more pulses individually and to each of the one or more quantum signal blocks with a defined phase difference between the each of the one or more pulses individually and each of the one or more quantum signal blocks. The hybrid phase modulation is performed based on the assigned random label. Furthermore, the plurality of subsystems comprises a communication interface configured for transmitting the hybrid phase modulated quantum signal blocks to one or more receiving units using a quantum communication link.

In accordance with another embodiment of the present disclosure, a method for performing differential phase shift in a network is disclosed. The method includes determining a quantum key distribution (QKD) configuration for a quantum signal comprising a series of pulses based on signal amplitude, signal pulse width and block length. The method includes grouping one or more pulses to generate one or more quantum signal blocks based on determined QKD configuration. The one or more quantum signal blocks comprises sequence of one or more pulses. The method includes assigning a random label to each of the one or more quantum signal block based on the determined quantum key distribution configuration. Further, the method includes performing hybrid phase modulation to each of the one or more pulses individually and to each of the one or more quantum signal blocks with a defined phase difference between the each of the one or more pulses individually and each of the one or more quantum signal blocks. The hybrid phase modulation is performed based on the assigned random label. Also, the method includes transmitting the hybrid phase modulated quantum signal blocks to one or more receiving units using a quantum communication link.

In accordance with yet another embodiment of the present disclosure, a quantum key network is disclosed. The quantum key network comprises a transmitter node for transmitting quantum signal blocks to a receiver node via a quantum communication channel. The quantum signal blocks are hybrid phase modulated using a pi phase difference. The quantum network also comprises the receiver node configured for receiving the quantum signal blocks from the transmitter node and evaluating security of the quantum communication channel by analysis of monitoring parameters, monitoring signals and coincident measurement.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "subsystem" that is configured and operated to perform certain operations. In one embodiment, the "subsystem" may be implemented mechanically or electronically, so a subsystem may comprise dedicated circuitry or logic that is permanently configured (within a special-purpose processor) to perform certain operations. In another embodiment, a "subsystem" may also comprise programmable logic or circuitry (as encompassed within a general-purpose processor or other programmable processor) that is temporarily configured by software to perform certain operations.

Accordingly, the term "subsystem" should be understood to encompass a tangible entity, be that an entity that is physically constructed permanently configured (hardwired) or temporarily configured (programmed) to operate in a certain manner and/or to perform certain operations described herein.

Embodiments of the present disclosure provide a system and method for performing differential phase shift in quantum network. The present disclosure generally relates to a method of performing quantum key distribution (QKD) using reconfigurable compartments of train of quantum signals with reconfigurable quantum amplitudes in differential phase shift (DPS) QKD. The method generates phase randomized compartments providing security against Phase attack on quantum signals. The disclosure generates secure symmetric keys based on difference of phase of consecutive quantum signals. The disclosure is applicable to phase encoded QKD protocols particularly DPS QKD. The present disclosure generate secure keys against sequential attack and coherent attacks of DPS QKD.

Referring now to the drawings, and more particularly to FIG. 1 through 5, where similar reference characters denote corresponding features consistently throughout the figures, there are shown preferred embodiments and these embodiments are described in the context of the following exemplary system and/or method.

Figure 1:
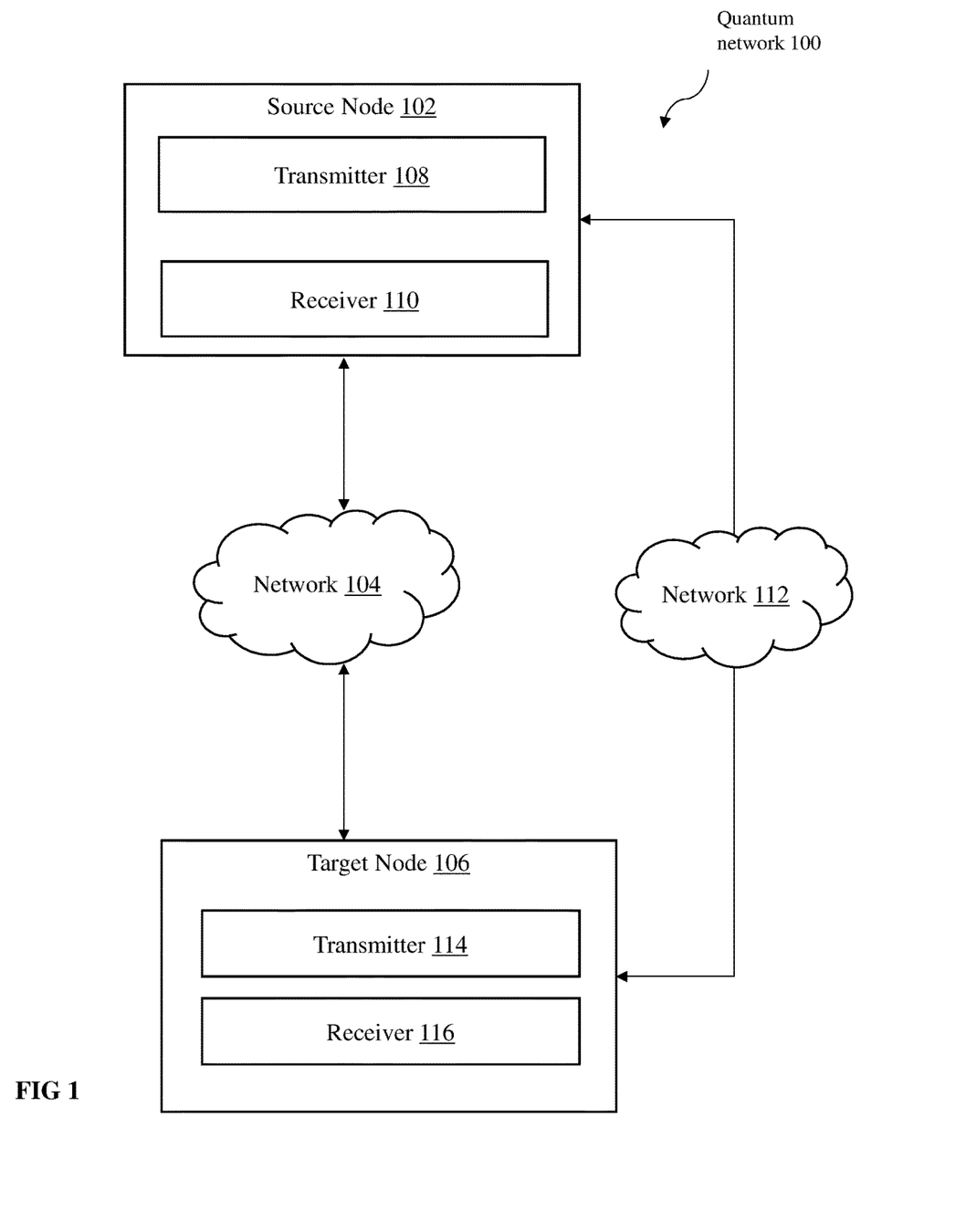
FIG. 1 is a block diagram illustrating an exemplary quantum network capable of performing differential phase shift in accordance with an embodiment of the present disclosure.

FIG. 1 is a block diagram illustrating an exemplary quantum network 100 capable of performing differential phase shift in accordance with an embodiment of the present disclosure. The quantum network 100 comprises a source quantum node 102 connected to a target node 106 via a quantum channel 104. Additionally, the source quantum node 102 is connected to the target quantum node 106 via a classic communication channel 112. Therefore, the source quantum node 102 is connected to the target quantum node 106 via the quantum channel 104 and the classic communication channel 112. The source quantum node 102 and the target quantum node 106 are quantum key distribution systems. Although, in FIG. 1, the source quantum node 102 is connected to one target quantum node 106, a person skilled in the art may envision that the source quantum node 102 may be connected to more than one target quantum nodes.

The quantum network 100 may be any known network type. The quantum network 100 may be comprised by an arrangement of free space transmitters and receivers forming a free space network. In an embodiment, the quantum network 100 may also comprise waveguide links between the nodes, for instance fibre optic. The quantum network 100 may be implemented purely for QKD purposes, i.e., the quantum network 100 may be a backbone carrying QKD signals only, to establish quantum keys between nodes that can then be used to encrypt conventional communications between the nodes sent via some other medium, for instance via another network—a wired electrical, wireless, or separate quantum network 100 for example.

The classic channel 112 may be wired or wireless network, and the quantum channel 104 can be a fibre channel, a quantum channel in free space, and the like. The classic channel 112 may be a direct point-to-point physical connection between two nodes or can be a logic connection established by connecting the two nodes to a classic network. The quantum channel 104 are optical networks which may be any known type of optical network allowing exchange of suitable quantum signals.

In an embodiment, the source quantum node 102 comprises a transmitter 108, and a receiver 110. The receiver 110 is configured for receiving a request for generating pair of quantum keys between the source quantum node 102 and a target quantum node 106 in the network 100. The request comprises communication address of the target quantum node 106, a communication path to be used in exchanging the quantum keys, communication channel information and the like. A quantum key is a random bit string. The transmitter 108 is configured for transmitting the generated first pair of quantum keys to the target quantum node 106 using a quantum link 104 between the source quantum node 102 and the target quantum node 106. The transmission may occur using any known quantum key distribution scheme. In an embodiment, the transmitter 108 is also configured for sending valid time stamp data to the target quantum node 106.

The target quantum node 110 comprises a transmitter 114 and a receiver 116. The transmitter 114 is configured for sending an acknowledgement message on receipt of the pair of quantum keys to the source quantum node 102 via an internet 112. The acknowledgement message comprises respective timestamp data. The receiver 116 is configured for receiving the pair of quantum keys from the source quantum node 102.

Those of ordinary skilled in the art will appreciate that the hardware depicted in FIG. 1 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a quantum key distribution system as is unique to the present disclosure or necessary for an understanding of the present disclosure is depicted and described. The remainder of the construction and operation of the quantum key distribution system may conform to any of the various current implementation and practices known in the art.

Figure 2:
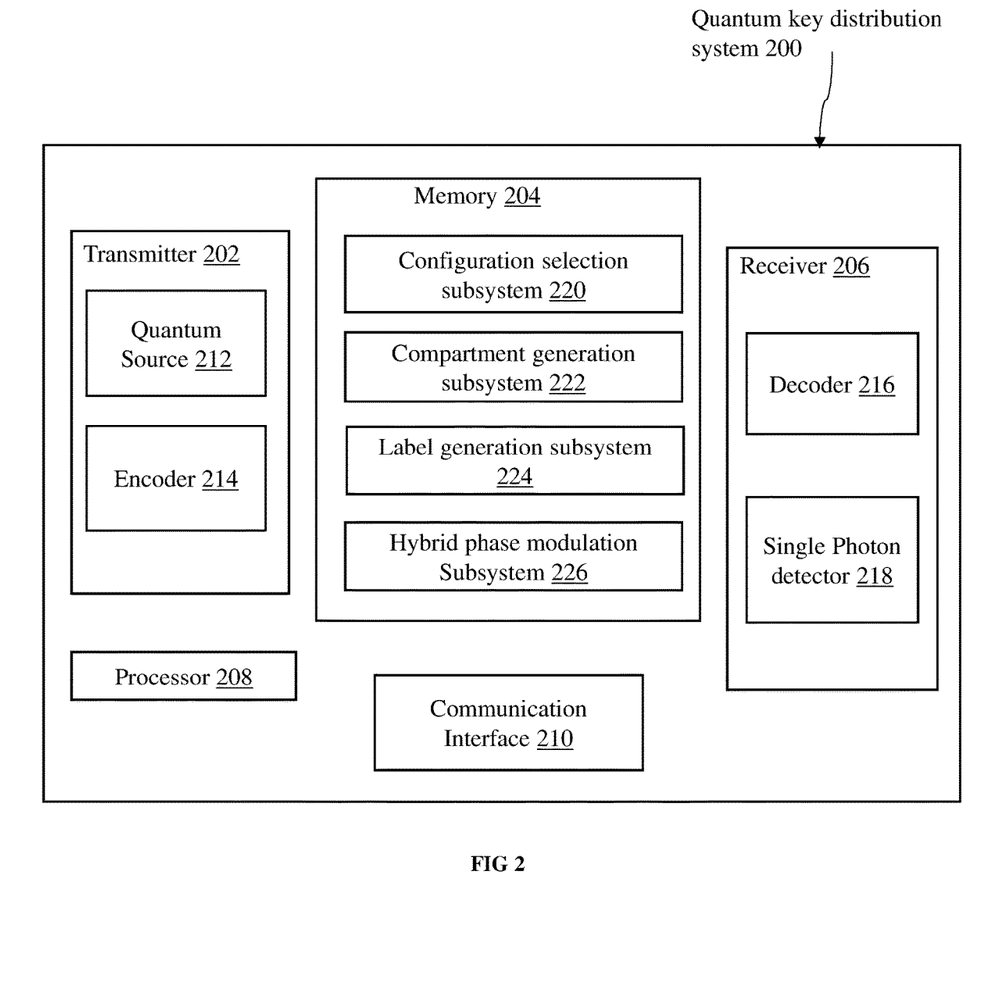
FIG. 2 is a block diagram illustrating an exemplary quantum key distribution system, such as a source node or a target node as shown in FIG. 1, for performing differential phase shift in accordance with an embodiment of the present disclosure.

FIG. 2 is a block diagram illustrating an exemplary quantum key distribution system 200, such as a source node or a target node as shown in FIG. 1, for performing differential phase shift in accordance with an embodiment of the present disclosure. The quantum key distribution system 200 comprises a transmitter 202, a memory 204, a receiver 206, a processor 208 and an interface 210.

The transmitter 202 comprises a quantum source 212 and an encoder 214. The quantum source 212 emits pairs of photons in a desired entangled state. The photon pairs exhibit strong correlations in time, and entanglement in the degree of freedom in which the quantum information is encoded. The single photons comprising each of these entangled pairs are sent to other nodes in the quantum network 100 via free-space communication links (such as quantum link 104).

The encoder 214 is configured for encoding the generated pair of quantum keys to the target quantum node 110. In an exemplary embodiment, a polarization state of photons are used to encode key bits.

The memory 204 and the processor 208 may be communicatively coupled by a system bus or a similar mechanism.

The processor(s) 208, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 208 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the processor(s) 208, such as being a computer-readable storage medium. The processor(s) 208 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes a plurality of subsystems stored in the form of machine-readable instructions on any of the above-mentioned storage media and may be in communication with and executed by the processor(s) 208.

The memory 204 includes a plurality of subsystems in the form of programmable instructions executable by the one or more hardware processors 208. The plurality of subsystems includes a configuration selection subsystem 220, a compartment generation subsystem 222, a label generation subsystem 224, and a hybrid phase modulation subsystem 226.

The configuration selection subsystem 220 is configured for determining a quantum key distribution (QKD) configuration for a quantum signal comprising a series of pulses based on signal amplitude, signal pulse width and block length. The quantum key distribution configuration comprises of a computational engine 1 (CE1). The CE1 specifies values for selection of configuration parameters, for example, width of pulse, duty cycle, alignment of the pulse, shape of the pulse, encoding style, source selection (TRNG, QRNG) and the like.

Each of the quantum signal comprises a series of pulses. In determining the quantum key distribution (QKD) configuration for the quantum signal comprising the series of pulses based on the signal amplitude, the signal pulse width and the block length, the configuration selection subsystem 220 is configured for auto calibrating and tuning quantum amplitude of the quantum signal to optimal amplitude based on range of quantum transmission and signal pulse width. The optimal amplitude of quantum signal comprises of an optimal value of average photon number that would produce maximum secure keys at a given distance. The range of distance varies from a distance of co-location of both the nodes to the distance at which the secure key generation is greater than zero. The method involves auto calibrating and tuning quantum amplitude to optimal amplitude in accordance with a range of quantum transmission and also with range if required. The quantum key distribution (QKD) configuration for the quantum signal is reconfigurable to an updated configuration based on updated signal amplitude, updated signal pulse width and updated block length. In an embodiment, the quantum signal amplitude is configured for monitoring and key generation in terms of compartments, pulse width and amplitude.

The compartment generation subsystem 222 is configured for grouping one or more pulses to generate one or more quantum signal blocks based on determined QKD configuration. This generates compartmentalized train of quantum signals. The one or more quantum signal blocks comprises grouped sequence of one or more pulses. In grouping one or more pulses to generate the one or more quantum signal blocks based on determined QKD configuration, the compartment generation subsystem 222 is configured for generating one or more-time tags for each of the one or more quantum signal blocks. The one or more time tags refer to time of the event. A computational method of time tagging with labels of the compartmentalized train of quantum signals is used. In an embodiment, the computational method may be a mathematical algorithm for segregating the detection events at Bob node based on nature of compartmentalized train of quantum signals.

The label generation subsystem 224 is configured for assigning a random label to each of the one or more quantum signal blocks based on the determined quantum key distribution configuration. The random label is generated from quantum random number generator (QRNG). In an embodiment, a mathematical algorithm is used to generate labels and length of compartments from random entropy source.

The hybrid phase modulation subsystem 226 is configured for performing hybrid phase modulation to each of the one or more pulses individually and to each of the one or more quantum signal blocks with a defined phase difference between the each of the one or more pulses individually and each of the one or more quantum signal blocks. The hybrid phase modulation is performed based on the assigned random label. In other words, the hybrid phase modulation is performed on the compartmentalized and labelled train of pulses. The individual phase modulation on respective optical pulses is provided by encoding of the optical pulses by phase 0 and pi which can be considered as set-1 or pi/2 and 3pi/2 which can be considered as set-2. These encoding phase values from each set can be considered for encoding of 0 and 1 respectively. The hybrid phase modulation subsystem 226 can choose amongst the two sets, however cannot select both. For compartmentalized phase encoding is done with random selection of phase value from a pool of phase values. This feature provides the security of the QKD for realistic implementation with weak coherent source. To be precise, a coherent state is considered to be a mixture of Fock states by assuming that its phase is continuously randomized. This condition is satisfied using discrete phase randomization which now bridges the gap between theory and practical devise.

In performing the hybrid phase modulation to each of the one or more pulses individually and to each of the one or more quantum signal blocks with the defined phase difference between the each of the one or more pulses individually and each of the one or more quantum signal blocks, the hybrid phase modulation subsystem 226 is configured for performing random phase modulation for the one or more pulses individually. Further, the hybrid phase modulation subsystem 226 is configured for performing random phase modulation for each of the one or more quantum signal blocks. Further, the hybrid phase modulation subsystem 226 is configured for interleaving the random phase modulated one or more pulses and random phase modulated one or more quantum signal blocks using a pi phase difference. In an embodiment, the hybrid phase modulation subsystem 226 interleaves two types of phase modulations for different purposes, one where random phase modulation of compartments to secure against phase attack and other is with random individual phase modulation of pulses between any two-phase values of pi separation.

The receiver 206 comprises a decoder 216 and a single photon detector 218. The receiver 206 is configured for demodulating the hybrid phase modulated quantum signal blocks using an interferometer upon receiving the hybrid phase modulated quantum signal blocks from a transmitter node, such as the source node 102. The receiver 206 is further configured for extracting one or more monitoring parameters associated with the demodulated quantum signal blocks. The one or more monitoring parameters comprises of transmission rate, coincidence counts, after-pulsing, dark counts, parity leakage during error correction and the like. Also, the receiver 206 is configured for evaluating security level of the quantum communication link by analyzing the extracted one or more monitoring parameters, monitoring signals and coincident measurement. The analysis refers to the security level calculation from leakages due to quantum adversary and classical adversary. The analysis of the security parameter from composable security framework. Evaluation of security level comprises analysis of a collection of measurements including coincidence measurement, photon statistics, rate of clicks and error rate.

Further, the receiver 206 is configured for post processing the demodulated quantum signal blocks to generate quantum secure keys based on difference of phase of consecutive quantum signals. The quantum secure key is generated against sequential attack by monitoring quantum signal. In an embodiment, the quantum secure key is generated against sequential attack by monitoring quantum signal. Further, the quantum secure key is generated with security against coherent attack providing information theoretic security. In an embodiment, the single photon detectors 218 are used to detect the photons generated at the transmitter 114 of the source quantum node 102. For example, the single photon detector 218 detects the events (such as 'clicks'). These detected events are transmitted to the target quantum node 110 accordingly. The detectors may be of various types of single-photon counters. The decoder 216 is configured for decoding the quantum signal transmitted by the source quantum node 102 using any known standard decoding algorithms.

The plurality of subsystems further comprises an eavesdropping detecting subsystem configured for performing fiber tapping on quantum communication link to determine eavesdropping of the quantum signal. In an embodiment, eavesdropping is detected based on fiber tapping attack on the quantum channel 104.

The interface 210 is configured for transmitting the hybrid phase modulated quantum signal blocks to one or more receiving units, such as receiver 206, using a quantum communication link 104. The interface 210 is configured for enabling communication between various components of the quantum system 200 and with the target quantum node 106.

Figure 3:
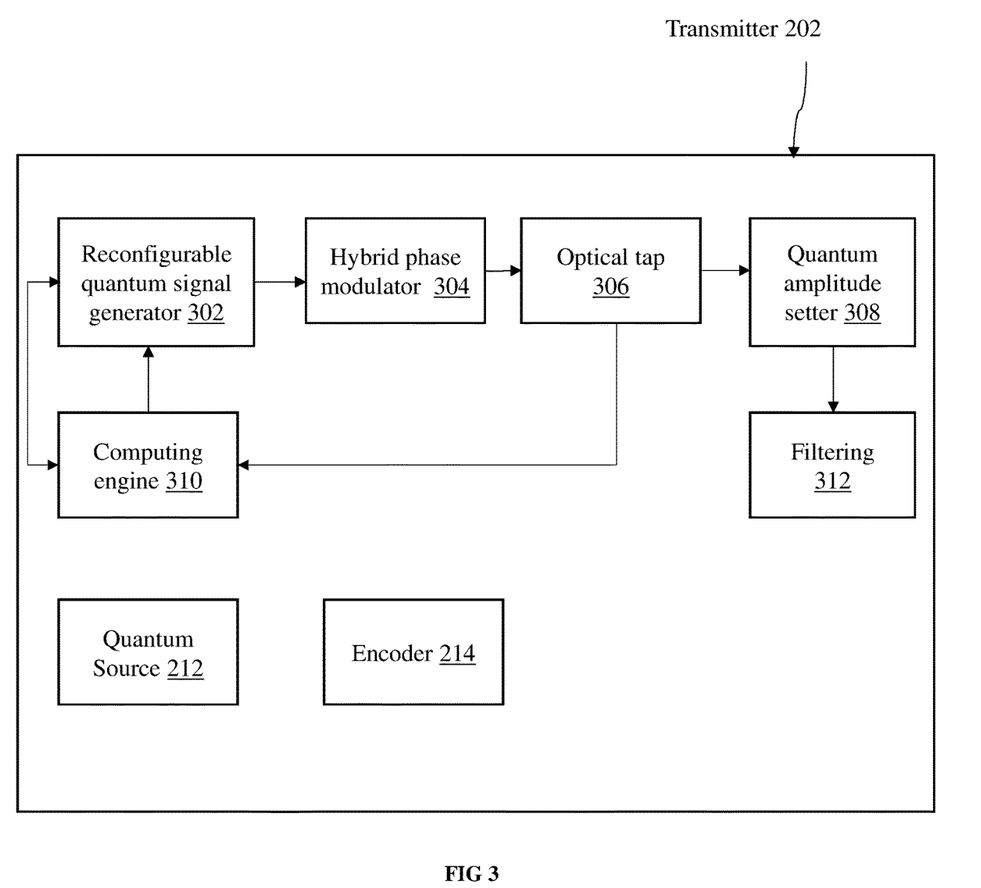
FIG. 3 is a block diagram illustrating an exemplary transmitter node, such as those show in FIG. 1 and FIG. 2, in accordance with an embodiment of the present disclosure.

FIG. 3 is a block diagram illustrating an exemplary transmitter node 202, such as those show in FIG. 1 and FIG. 2, in accordance with an embodiment of the present disclosure. The transmitter node 202 comprises a reconfigurable quantum signal generator 302, a hybrid phase modulator 304, an optical tap 306, a quantum amplitude setter 308, a computing engine 310, a filtering 312, a quantum source 212 and an encoder 214. The reconfigurable quantum signal generator 302 produces optical signals compartmentalized and labelled based on random numbers. Optical signals are generated from combination of two lasers selected on basis of labels. The reconfigurable quantum signal generator 302 has multiple modules that take care of synchronization of the optical signals for proper and precise encoding. The reconfigurable quantum signal generator 302 receives input from configurable wavelength generator, reconfigurable duty cycle unit, tuneable pulse wave shaper, tuneable delay tap, compartmentalization and labelling unit, and computing engine 310.

The hybrid phase modulator 304 encodes the phase randomly between two phase values with Pi phase difference between them. The hybrid phase modulator 304 encodes a random phase to the optical compartments. According to the labels of the compartments, the phase modulation of adjacent optical signals are configured. The hybrid phase modulator 304 receives input from an encoding adjacent pulses with Pi phase difference unit, a configurable multiblock phase randomizer, a tuneable pulse wave shaper, a tuneable delay tap, a reconfigurable pulse duty cycle and reconfigurable quantum signal generator 302.

The optical tap 306 gives a feedback to the source for tuning quantum signal. The quantum amplitude setter 308 produces required attenuation for the signal based on the configuration and label. The quantum amplitude setter 308 provides reconfigurable attenuation of compartmentalized train of pulses according to the labels. The reconfigurable attenuation of quantum signal refers to attenuation that can be auto calibrated for any given optical pulse width of the quantum signal, where quantum amplitude is varied for random variable compartments.

The quantum amplitude setter 308 receives input from course and fine tuneable attenuator unit, an optimal attenuation unit, a distance simulation unit. The filtering 312 filters the quantum signal for particular wavelength of operation. The filtering unit 312 receives input from a wave filter side band suppressor and a circulator. The computing engine 310 receives input from multiprocessing units and random number generator. The quantum link is an optical fibre to carry the quantum signal from transmitter to receiver. The quantum source 212 and the encoder 214 is similar to those explained in FIG. 2.

Figure 4:
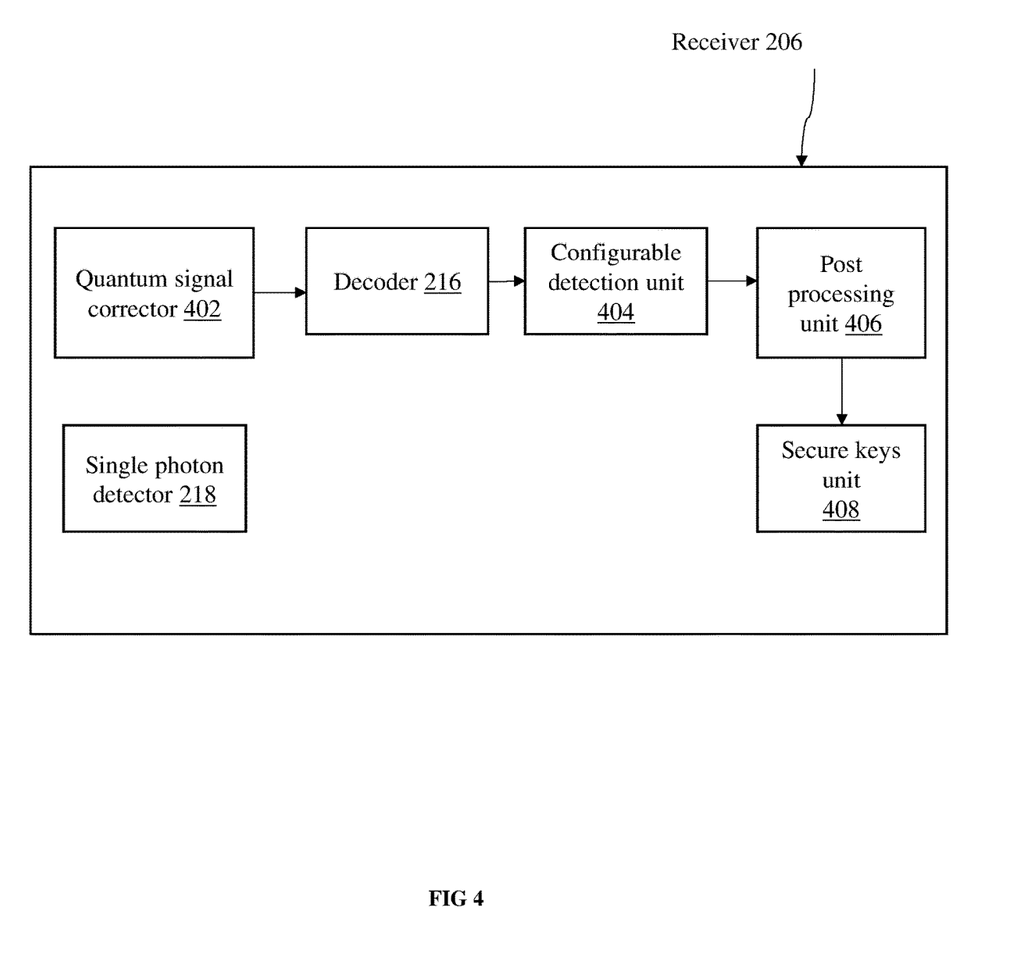
FIG. 4 is a block diagram illustrating an exemplary receiver node, such as those show in FIG. 1 and FIG. 2, in accordance with an embodiment of the present disclosure.

FIG. 4 is a block diagram illustrating an exemplary receiver node 206, such as those show in FIG. 1 and FIG. 2, in accordance with an embodiment of the present disclosure. The receiver node 206 or a target node 106 comprises a quantum signal corrector 402, a decoder 216, a configurable detection unit 404, a post processing unit 406, a secure key generator 408, and a single photon detector 218. The quantum signal corrector 402 allows required signal to enter the receiver node 206. The quantum signal corrector 402 plays an important role in safeguarding the receiver node 206 from malicious input. The quantum signal corrector 402 receives input from dynamic corrector. The decoder 216 decodes the signal from a delay line interferometer with one input port (incoming signal) and two output ports, that can overlap the adjacent signals and produce the interference results from the two output ports. The decoder 216 receives input from temperature-controlled delay line interferometer (DLI), a multiprocessing computing element for asymmetric measurement and an interferometer. The configurable detection unit 404 produces signals to be filtered for the desired wavelength and rest of it is absorbed by the filter. The optical signals are detected, digitized and time stamped. The signals can be detected for flexible settings of gate duty cycle, tuning, resolution requirement, computational algorithms for extinction ratio calibration and single photon detectors capable of detecting photons. The configurable detection unit 404 receives input from optical signal filtering unit, a reconfigurable gate duty cycle unit, a high precision gate tuneable unit, a high precision configurable resolution time to digital counter unit, a multiprocessing computing element for extension ratio computing unit, the single photon detector 218, a time tagging events, a filtering unit, and a quantumness validation module. The post processing unit 406 produces secure key generation after error correction and privacy amplification of the sifted key bits. The post processing unit 406 receives input from error correction unit and privacy amplification unit. The secure key generation unit 408 generates a secure key.

Figure 5:
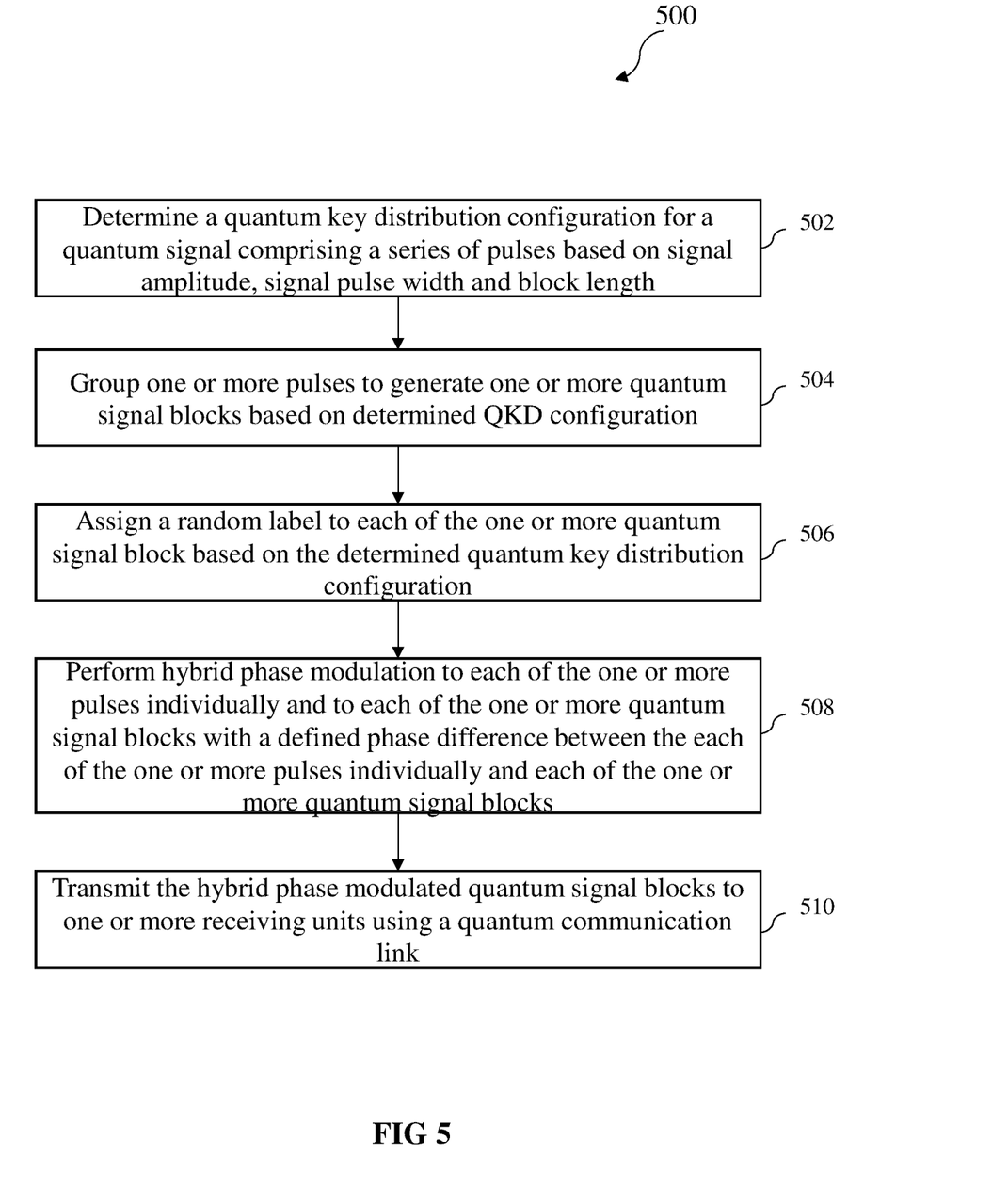
FIG. 5 is a flow diagram illustrating an exemplary method for performing differential phase shift in accordance with an embodiment of the present disclosure.

FIG. 5 is a flow diagram illustrating an exemplary method 500 for performing differential phase shift in accordance with an embodiment of the present disclosure. At step 502, a quantum key distribution (QKD) configuration is determined for a quantum signal comprising a series of pulses based on signal amplitude, signal pulse width and block length. At step 504, one or more pulses are grouped to generate one or more quantum signal blocks based on determined QKD configuration. The one or more quantum signal blocks comprises sequence of one or more pulses. At step 506, a random label is assigned to each of the one or more quantum signal block based on the determined quantum key distribution configuration. At step 508, a hybrid phase modulation is performed to each of the one or more pulses individually and to each of the one or more quantum signal blocks with a defined phase difference between the each of the one or more pulses individually and each of the one or more quantum signal blocks. The hybrid phase modulation is performed based on the assigned random label. At step 510, the hybrid phase modulated quantum signal blocks are transmitted to one or more receiving units using a quantum communication link 104.

Various embodiments of the present system provide a technical solution to the problem of performing quantum key distribution (QKD) using reconfigurable compartments of train of quantum signals with reconfigurable quantum amplitudes in differential phase shift (DPS) QKD. The method generates phase randomized compartments providing security against Phase attack on quantum signals. The disclosure generates secure symmetric keys based on difference of phase of consecutive quantum signals. The disclosure is applicable to phase encoded QKD protocols particularly DPS QKD. The disclosure generates Enhanced NRBG from the QRNG from the quantum signal. The method generate secure keys against Sequential attack and Coherent attacks of DPS QKD.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for distributing quantum keys on a quantum device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

The invention claimed is:

1. A quantum key distribution system for performing differential phase shift in a network, the quantum key distribution system comprising: a hardware processor; and a memory coupled to the hardware processor, wherein the memory comprises a set of program instructions in the form of a plurality of subsystems, executed by the hardware processor, wherein the plurality of subsystems comprises: a configuration selection subsystem determining a quantum key distribution (QKD) configuration for a quantum signal comprising a series of pulses based on signal amplitude, signal pulse width and block length; a compartment generation subsystem grouping one or more pulses to generate one or more quantum signal blocks based on determined QKD configuration, wherein the one or more quantum signal blocks comprises grouped sequence of one or more pulses; a label generation subsystem assigning a random label to each of the one or more quantum signal blocks based on the determined quantum key distribution configuration; a hybrid phase modulation subsystem performing hybrid phase modulation to each of the one or more pulses individually and to each of the one or more quantum signal blocks with a defined phase difference between the each of the one or more pulses individually and each of the one or more quantum signal blocks, wherein the hybrid phase modulation is performed based on the assigned random label; and a communication interface transmitting the hybrid phase modulated quantum signal blocks to one or more receiving units using a quantum communication link; and demodulating the hybrid phase modulated quantum signal blocks using an interferometer upon receiving the hybrid phase modulated quantum signal blocks from a transmitter node; extracting one or more monitoring parameters associated with the demodulated quantum signal blocks; evaluating security level of the quantum communication link by analyzing the extracted one or more monitoring parameters, monitoring signals and coincident measurement; and post processing the demodulated quantum signal blocks to generate quantum secure keys based on difference of phase of consecutive quantum signals.

2. The quantum key distribution system of claim 1, wherein in determining the quantum key distribution (QKD) configuration for the quantum signal comprising the series of pulses based on the signal amplitude, the signal pulse width and the block length, the configuration selection subsystem: auto calibrating and tuning quantum amplitude of the quantum signal to optimal amplitude based on range of quantum transmission and signal pulse width.

3. The quantum key distribution system of claim 1, wherein in grouping one or more pulses to generate the one or more quantum signal blocks based on determined QKD configuration, the compartment generation subsystem: generating one or more-time tags for each of the one or more quantum signal blocks.

4. The quantum key distribution system of claim 1, wherein in performing the hybrid phase modulation to each of the one or more pulses individually and to each of the one or more quantum signal blocks with the defined phase difference between the each of the one or more pulses individually and each of the one or more quantum signal blocks, the hybrid phase modulation subsystem: performing random phase modulation for the one or more pulses individually; performing random phase modulation for each of the one or more quantum signal blocks; and interleaving the random phase modulated one or more pulses and random phase modulated one or more quantum signal blocks using a pi phase difference.

5. The quantum key distribution system of claim 1, wherein the quantum secure key is generated against sequential attack by monitoring quantum signal.

6. The quantum key distribution system of claim 1, wherein the quantum secure key is generated against sequential attack by monitoring quantum signal.

7. The quantum key distribution system of claim 1, wherein the quantum secure key is generated with security against coherent attack providing information theoretic security.

8. The quantum key distribution system of claim 1, further comprises an eavesdropping detecting subsystem performing fiber tapping on quantum communication link to determine eavesdropping of the quantum signal.

9. The quantum key distribution system of claim 1, wherein the quantum key distribution (QKD) configuration for the quantum signal is reconfigurable to an updated configuration based on updated signal amplitude, updated signal pulse width and updated block length.

10. A method for performing quantum key distribution in a network, the method comprising: determining, by a processor, a quantum key distribution (QKD) configuration for a quantum signal comprising a series of pulses based on signal amplitude, signal pulse width and block length; grouping, by the processor, one or more pulses to generate one or more quantum signal blocks based on determined QKD configuration, wherein the one or more quantum signal blocks comprises sequence of one or more pulses; assigning, by the processor, a random label to each of the one or more quantum signal block based on the determined quantum key distribution configuration; performing, by the processor, hybrid phase modulation to each of the one or more pulses individually and to each of the one or more quantum signal blocks with a defined phase difference between the each of the one or more pulses individually and each of the one or more quantum signal blocks, wherein the hybrid phase modulation is performed based on the assigned random label; and transmitting, by the processor, the hybrid phase modulated quantum signal blocks to one or more receiving units using a quantum communication link; and demodulating the hybrid phase modulated quantum signal blocks using an interferometer upon receiving the hybrid phase modulated quantum signal blocks from a transmitter node; extracting one or more monitoring parameters associated with the demodulated quantum signal blocks; evaluating security level of the quantum communication link by analyzing the monitoring parameters, monitoring signals and coincident measurement; and post processing the demodulated quantum signal blocks to generate quantum secure keys based on difference of phase of consecutive quantum signals.

11. The method of claim 10, wherein determining the quantum key distribution (QKD) configuration for the quantum signal comprising the series of pulses based on the signal amplitude, the signal pulse width and the block length comprises: auto calibrating and tuning quantum amplitude of the quantum signal to optimal amplitude based on range of quantum transmission and signal pulse width.

12. The method of claim 10, wherein grouping one or more pulses into one or more quantum signal blocks based on determined QKD configuration comprises: generating one or more-time tags for each of the one or more quantum signal blocks.

13. The method of claim 10, wherein performing the hybrid phase modulation to each of the one or more pulses individually and to each of the one or more quantum signal blocks with the defined phase difference between the each of the one or more pulses individually and each of the one or more quantum signal blocks comprises: performing random phase modulation for the one or more pulses individually; performing random phase modulation for each of the one or more quantum signal blocks; and interleaving the random phase modulated one or more pulses and random phase modulated one or more quantum signal blocks using a pi phase difference.

14. The method of claim 10, wherein the quantum secure key is generated against sequential attack by monitoring quantum signal.

15. The method of claim 10, wherein the quantum secure key is generated against sequential attack by monitoring quantum signal.

16. The method of claim 10, wherein the quantum secure key is generated with security against coherent attack providing information theoretic security.

17. The method of claim 10, further comprising: performing fiber tapping on quantum communication link to determine eavesdropping of the quantum signal.

18. The method of claim 10, wherein the quantum key distribution (QKD) configuration for a quantum signal is reconfigurable to an updated configuration based on updated signal amplitude, updated signal pulse width and updated block length.

\* \* \* \* \*